United States Patent
Yoshida et al.

(10) Patent No.: US 10,978,737 B2
(45) Date of Patent: Apr. 13, 2021

(54) NONAQUEOUS ELECTROLYTE SOLUTION AND SECONDARY BATTERY

(71) Applicant: NEC Corporation, Tokyo (JP)

(72) Inventors: Noboru Yoshida, Tokyo (JP); Ikiko Shimanuki, Tokyo (JP); Shinsaku Saitho, Tokyo (JP); Hitoshi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 336 days.

(21) Appl. No.: 15/321,649

(22) PCT Filed: Jun. 23, 2015

(86) PCT No.: PCT/JP2015/068007
§ 371 (c)(1),
(2) Date: Dec. 22, 2016

(87) PCT Pub. No.: WO2015/199063
PCT Pub. Date: Dec. 30, 2015

(65) Prior Publication Data
US 2017/0214087 A1   Jul. 27, 2017

(30) Foreign Application Priority Data
Jun. 23, 2014 (JP) .............................. JP2014-128589

(51) Int. Cl.
*H01M 10/0567* (2010.01)
*H01M 10/0569* (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
CPC .......... H01M 10/0566–0569; H01M 10/4235; H01M 4/131; H01M 4/133; H01M 4/525;
(Continued)

(56) References Cited

U.S. PATENT DOCUMENTS

| 6,040,090 A * | 3/2000 | Sunagawa | H01M 4/131 429/223 |
| 2004/0115117 A1 * | 6/2004 | Takei | H01M 4/133 423/448 |

(Continued)

FOREIGN PATENT DOCUMENTS

| CN | 101682079 A | 3/2010 |
| CN | 102324562 A | 1/2012 |

(Continued)

OTHER PUBLICATIONS

Google Patents Translation of CN102324562 originally published to Yang et al. Jan. 18, 2012 (Year: 2012).*

(Continued)

*Primary Examiner* — Gregg Cantelmo
(74) *Attorney, Agent, or Firm* — Finnegan, Henderson, Farabow, Garrett & Dunner, L.L.P.

(57) ABSTRACT

The present invention relates to an electrolyte solution comprising a supporting salt, a nonaqueous solvent containing a compound having a viscosity of 1.0 mPa-s or less in an amount of more than 50% by volume in the nonaqueous solvent, and a halogenated cyclic acid anhydride. According to the present invention, an electrolyte solution capable of suppressing gas generation is provided.

10 Claims, 3 Drawing Sheets

(51) Int. Cl.
*H01M 10/052* (2010.01)
*H01M 10/42* (2006.01)
*H01M 4/131* (2010.01)
*H01M 4/525* (2010.01)
*H01M 10/0525* (2010.01)
*H01M 4/133* (2010.01)
*H01M 4/587* (2010.01)

(52) U.S. Cl.
CPC ........... *H01M 4/525* (2013.01); *H01M 4/587* (2013.01); *H01M 10/052* (2013.01); *H01M 10/0525* (2013.01); *H01M 10/0569* (2013.01); *H01M 10/4235* (2013.01); *H01M 2220/20* (2013.01); *H01M 2300/0028* (2013.01); *Y02E 60/10* (2013.01); *Y02P 70/50* (2015.11); *Y02T 10/70* (2013.01)

(58) Field of Classification Search
CPC ............... H01M 4/587; H01M 10/052; H01M 10/0525; H01M 10/0567; H01M 10/0569
See application file for complete search history.

(56) References Cited

U.S. PATENT DOCUMENTS

| | | | | |
|---|---|---|---|---|
| 2008/0241702 | A1* | 10/2008 | Takahashi | H01M 10/0567 429/332 |
| 2013/0089779 | A1* | 4/2013 | Ihara | H01M 10/0525 429/200 |
| 2013/0136997 | A1* | 5/2013 | An | H01M 10/0525 429/302 |

FOREIGN PATENT DOCUMENTS

| | | | |
|---|---|---|---|
| CN | 102694161 | A | 9/2012 |
| CN | 103178251 | A | 6/2013 |
| CN | 103346350 | A | 10/2013 |
| CN | 103400993 | A | 11/2013 |
| CN | 103825015 | A | 5/2014 |
| EP | 2863469 | A1 * | 4/2015 ............ H01M 4/485 |
| JP | 7-122297 | | 5/1995 |
| JP | 2000-268859 | | 9/2000 |
| JP | 2003-86244 | | 3/2003 |
| JP | 2007-95457 | | 4/2007 |
| JP | 2010-238504 | | 10/2010 |
| JP | 2011-60464 | | 3/2011 |
| WO | WO 2013/187487 | A1 | 12/2013 |
| WO | WO 2015/037382 | A1 | 3/2015 |

OTHER PUBLICATIONS

Google Patents Translation of JP 2003-086244 originally published to Nakagawa et al. Mar. 20, 2003 (Year: 2003).*
Yang et al. "Microwave-assisted synthesis of LiNi0.5Co0.5O2 cathode material for lithium batteries using PAM as template." Electrochimica Acta 51, pp. 4971-4976 (Year: 2006).*
Notification of First Office Action dated Jun. 26, 2018, and English-language Translation, issued by the State Intellectual Property Office of the Peoples Republic of China in counterpart Chinese Patent Application No. 201580034205.4.
International Search Report and Written Opinion dated Oct. 6, 2015, in corresponding PCT International Application.
Notification of the Third Office Action dated Oct. 24, 2019, and English-language Translation, issued by the Chinese National Intellectual Property Administration in counterpart Chinese Patent Application No. 201580034205.4.

* cited by examiner

NONAQUEOUS ELECTROLYTE SOLUTION AND SECONDARY BATTERY

CROSS-REFERENCE TO RELATED PATENT APPLICATIONS

This application is a National Stage Entry of International Application No. PCT/JP2015/068007, filed Jun. 23, 2015, which claims priority from Japanese Patent Application No. 2014-128589, filed Jun. 23, 2014. The entire contents of the above-referenced applications are expressly incorporated herein by reference.

TECHNICAL FIELD

The present invention relates to an electrolyte solution and a secondary battery comprising the electrolyte solution, and a method for manufacturing thereof.

BACKGROUND ART

With the rapid expansion market for mobile tablets, smart phones, electric vehicles, stationary power storage systems and the like, there has been a demand for secondary batteries having excellent performance.

One of the methods of improving the performance of the secondary battery, it is known a method of suppressing a decomposition reaction of the electrolyte solution by forming a protective film on the surface of electrode. For example, there has been proposed a method of forming a film on the surface of electrode by adding an additive to the electrolyte.

Patent Document 1 discloses an electrolyte solution containing an aprotic solvent and an acid anhydride.

Patent Document 2 discloses a secondary battery using a negative electrode containing graphite, a positive electrode, and a nonaqueous electrolyte solution prepared by dissolving a supporting salt and a cyclic acid anhydride in a mixed nonaqueous solvent containing a cyclic carbonate and an open-chain carbonate.

Patent Document 3 discloses a nonaqueous electrolyte solution containing an unsaturated cyclic acid anhydride.

Patent Document 4 discloses a nonaqueous electrolyte solution for a lithium secondary battery containing an open-chain carboxylic acid anhydride.

Patent Document 5 discloses a nonaqueous electrolyte solution containing, in addition to a lithium salt having an anion of oxalate complex, acid anhydride having fluorine atom(s) and/or carboxylic acid having fluorine atom(s) or a lithium salt of sulfonic acid.

CITATION LIST

Patent Document

Patent Document 1: Japanese Patent Laid-Open Publication No. H07-122297
Patent Document 2: Japanese Patent Laid-Open Publication No. 2000-268859
Patent Document 3: Japanese Patent Laid-Open Publication No. 2011-60464
Patent Document 4: Japanese Patent Laid-Open Publication No. 2007-95457
Patent Document 5: Japanese Patent Laid-Open Publication No. 2010-238504

SUMMARY OF INVENTION

Technical Problem

However, higher performance has been requested to a secondary battery, and thus, improvements in various battery characteristics are demanded. For example, in the secondary battery using the electrolyte solution containing an acid anhydride described in Patent Documents 1 to 4, an acid anhydride is oxidized and decomposed on the positive electrode, resulting that the battery performance is lowered. Also in the secondary battery described in Patent Document 5, a further improvement in terms of the suppression of gas generation is demanded.

An object of the present invention is to provide an electrolyte solution capable of suppressing gas generation.

Solution to Problem

One of the present embodiments relates to an electrolyte solution comprising a supporting salt, a nonaqueous solvent containing a compound having a viscosity of 1.0 mPa-s or less in an amount of more than 50% by volume in the nonaqueous solvent, and a halogenated cyclic acid anhydride.

Advantageous Effect of Invention

According to the present embodiment, it is possible to provide an electrolyte solution capable of suppressing gas generation.

DESCRIPTION OF EMBODIMENTS

Figure 1:
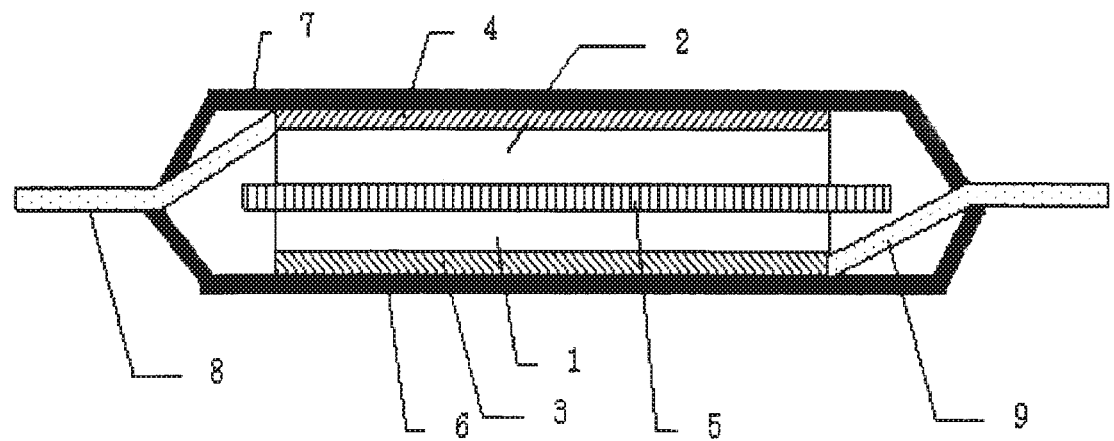
FIG. 1 is a schematic sectional view showing a configuration example of a secondary battery of the present embodiment.

Hereinafter, embodiments of the present invention will be described.

[1] Electrolyte Solution

An electrolyte solution (nonaqueous electrolyte solution) of the present embodiment comprises a supporting salt, a nonaqueous solvent for dissolving the support salt, and a halogenated cyclic acid anhydride, wherein the nonaqueous solvent includes compounds having a low viscosity in an amount of more than 50% by volume in the nonaqueous solvent.

Whereas the addition of halogenated acid anhydride in the electrolyte solution improves the capacity retention rate of the secondary battery, there is a problem that it increases the gas generation associated with charge and discharge, and therefore the volume increase of the battery increases. The present inventors found that it is possible to suppress the gas generation by using a compound having a low viscosity in an amount more than 50% by volume in the nonaqueous solvent containing a halogenated acid anhydride, even if the electrolyte solution comprises a halogenated acid anhydride compound.

The following reason is considered as the mechanism of the synergistic effect of suppressing gas generation by using a compound having a low viscosity in an amount more than 50% by volume in the nonaqueous solvent containing a halogenated acid anhydride. As mentioned above, a halogenated acid anhydride compound is decomposed by electrochemical oxidation-reduction reaction during charge and discharge reaction to form a film on the negative electrode surface, which suppresses the decomposition of the electrolyte solution or the support salt. On the other hand, since the electrolyte solution containing a halogenated acid anhydride have a high viscosity, the penetration of the electrolyte solution to the electrode reduces, and therefore it is not possible to form a film sufficiently during the first charge, leading to increase in gas generation associated with charge and discharge. Therefore, when a compound having a low viscosity is used in an amount more than 50% by volume in the solvent of the electrolyte solution, the wettability with electrodes is improved and the immersion of the electrolyte solution is increased, whereby the formation of a film takes place more effectively, for example, over the entire surface of the negative electrode. As a result, it is possible to suppress the gas generation in the electrolyte solution of the present embodiment. Herein, the above theory is speculation, and should not be considered as those limiting the present invention.

Hereinafter, examples of the components of the present invention will be described.

<Halogenated Acid Anhydride>

Halogenated acid anhydrides in the present embodiment are compounds in which at least one of the hydrogen atoms in acid anhydride compounds is replaced with halogen atom(s), such as fluorine, chlorine, bromine, and iodine (hereinafter, the compound in which at least one hydrogen atom is replaced with a halogen atom may be referred as simply "halogen compound" or "halogenated compound"). Acid anhydride compound is a compound having at least one acid anhydride structure in a molecule, and in addition, the acid anhydride may be a compound having a plurality of acid anhydride structure in a molecule.

In the present embodiment, the halogenated acid anhydride is preferably a halogenated acid anhydride having a cyclic structure (hereinafter, may be referred to as "halogenated cyclic acid anhydride(s)").

The halogenated cyclic acid anhydride in the present embodiment includes, but not particularly limited, for example, halogenated compounds of anhydrides of carboxylic acids, anhydrides of sulfonic acids, anhydrides of carboxylic acids and sulfonic acids and the like.

Specific examples of the halogenated carboxylic acid anhydrides having a cyclic structure include, but not limited to, halogenated compounds of succinic anhydride, glutaric anhydride, maleic anhydride, citraconic anhydride, glutaconic anhydride, itaconic anhydride, diglycolic anhydride, phenyl succinic anhydride, 2-phenyl glutaric anhydride, cyclohexanedicarboxylic anhydride, cyclopentane tetracarboxylic dianhydride, 4-cyclohexene-1,2-dicarboxylic anhydride, 3,4,5,6-tetrahydrophthalic anhydride, 5-norbornene-2,3-dicarboxylic anhydride, phthalic anhydride, and pyromellitic anhydride and the like; specifically, for example, fluorosuccinic anhydride, tetrafluorosuccinic anhydride, dichlorosuccinic anhydride, chloroglutaric anhydride, difluoroglutaric anhydride, and the like. These may be used alone or in combination of two or more of these.

Specific examples of the halogenated acid anhydrides having a cyclic structure include, but not limited to, halogenated compounds of 1,2-ethane disulfonic anhydride, 1,3-propane disulfonic anhydride, 1,4-butane disulfonic anhydride, 1,2-benzene disulfonic anhydride and the like; specifically, for example, tetrafluoro-1,2-ethane disulfonic anhydride, hexafluoro-1,3-propane disulfonic anhydride, octafluoro-1,4-butane disulfonic anhydride, 3-fluoro-1,2-benzenedicarboxylic anhydride, 4-fluoro-1,2-benzene dicarboxylic anhydride, 3,4,5,6-tetrafluoro-1,2-benzene dicarboxylic anhydride. These may be used alone or in combination of two or more of these.

Specific examples of the halogenated compound of anhydrides of carboxylic acids and sulfonic acids having a ring structure include, but not limited to, halogenated compounds of 3-sulfopropionic anhydride, 2-methyl-3-sulfopropionic anhydride, 2,2-dimethyl-3-sulfopropionic anhydride, 2-ethyl-3-sulfopropionic anhydride, 2,2-diethyl-3-sulfopropionic acid anhydride and the like; specifically, for example, 2-fluoro-3-sulfopropionic anhydride, 2,2-difluoro-3-sulfopropionic anhydride, 2,2,3,3-tetrafluoro-3-sulfopropionic anhydride; halogenated compounds of 2-sulfobenzoic anhydride and the like; specifically, for example, 3-fluoro-2-sulfobenzoic acid anhydride, 4-fluoro-2-sulfobenzoic acid anhydride, 5-fluoro-2-sulfobenzoic anhydride, 6-fluoro-2-sulfobenzoic anhydride, 3,6-difluoro-2-sulfobenzoic anhydride, 3,4,5,6-tetrafluoro-2-sulfobenzoic anhydride, 3-trifluoromethyl-2-sulfobenzoic anhydride, 4-trifluoromethyl-2-sulfobenzoic anhydride, 5-trifluoromethyl-2-sulfobenzoic anhydride, 6-trifluoromethyl-2-sulfobenzoic anhydride and the like. These may be used alone or in combination of two or more of these.

In this embodiment, the halogenated cyclic acid anhydride is preferably a halogenated cyclic carboxylic acid anhydride. Further, the halogenated cyclic carboxylic acid anhydride, more preferably a halogenated cyclic carboxylic acid anhydride represented by the following formula (I).

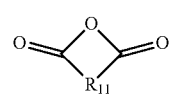

(I)

(In formula (I), $R_{11}$ is a substituted or unsubstituted alkylene group having 1 to 5 carbon atoms, a substituted or unsubstituted alkenylene group having 2 to 5 carbon atoms, a substituted or unsubstituted cycloalkan-diyl group having 5 to 12 carbon atoms, a substituted or unsubstituted cycloalken-diyl group having 5 to 12 carbon atoms, a substituted or unsubstituted benzene-diyl group, or a divalent group having 2 to 6 carbon atoms in which alkylene groups are bonded via an ether bond, with the proviso that at least part of the hydrogen atoms in $R_{11}$ are replaced by halogen atom(s).)

In the formula (I), alkylene group and alkenylene group for $R^{11}$ may be straight chain or branched.

In the formula (I), number of carbon atoms in the alkylene group for $R_{11}$ is preferably 1, 2, 3 or 4. Number of carbon atoms in the alkenylene group for $R_{11}$ is preferably 2, 3 or 4.

In the formula (I), number of carbon atoms in the cycloalkan-diyl group and cycloalken-diyl group for $R_{11}$ is preferably 5, 6, 7, 8, 9 or 10. Herein, cycloalkan-diyl group and cycloalken-diyl group may be a divalent group having a plurality of ring structures such as bicycloalkylene group or bicycloalkenylene group.

In the formula (I), "the divalent group having 2 to 6 carbon atoms in which alkylene groups are bonded via an ether bond" represents a divalent group in which two or more alkylene groups are bonded via ether bond(s) (—O—), and wherein two or more alkylene groups may be different and the same. Alkylene group may have a branched chain. Preferably the total number of carbon atoms of two or more alkylene groups is 2, 3, 4 or 5, and more preferably 2, 3 or 4.

In the formula (I), $R_{11}$ is more preferably a substituted or unsubstituted alkylene group having 2 to 5 carbon atoms, or a substituted or unsubstituted alkenylene group having 2 to 5 carbon atoms. It is more preferably a substituted or unsubstituted alkylene group having 2 or 3 carbon atoms, or a substituted or unsubstituted alkenylene group having 2 or 3 carbon atoms.

Further, in the formula (I), it is more preferable that carbon skeleton (carbon-carbon bonding) in $R_{11}$ is constituted all by single bonds. This is because that the gas generation due to an excessive reaction is considered to be suppressed as compared with the case containing a double bond in $R_{11}$. For example, $R_{11}$ is more preferably an alkylene group.

In the formula (I), substituents of $R_{11}$ include, for example, alkyl groups having 1 to 5 carbon atoms (for example, methyl group, ethyl group, propyl group, isopropyl group, butyl group), alkenyl groups having 2 to 6 carbon atoms (for example, vinyl group, 1-propenyl group, 2-propenyl group, 2-butenyl group), aryl groups (for example, phenyl group, benzyl group, tolyl group and xylyl group), alkoxy groups having 1 to 5 carbon atoms (for example, methoxy group, ethoxy group, n-propoxy group, isopropoxy group, n-butoxy group, tert-butoxy group), amino groups (including, dimethylamino group, methylamino group), carboxy group, hydroxy group, vinyl group, cyano group, or halogen atoms (for example, chlorine atom, bromine atom) and the like. $R_{11}$ may have one substituent or may have a plurality of substituents.

Preferred examples of the halogenated cyclic carboxylic acid anhydrides include halogenated compounds of succinic anhydride and glutaric anhydride. Among these, halogenated compounds of succinic anhydride are preferable.

It is presumed that the replacing at least one hydrogen atom of the acid anhydride with a halogen atom, improves oxidation resistance of the acid anhydride and suppresses the oxidation degradation at the positive electrode. As the halogen atoms for replacing hydrogen atom, the examples thereof include fluorine, chlorine, boron, and iodine atom. Among these, fluorine and chlorine atoms are preferred, and fluorine atom is particularly preferred. Further, higher halogen atom substitution ratio of hydrogen atoms {i.e., (number of atoms of halogen atoms)/(sum of hydrogen atoms and halogen atoms)} is preferred, and it is preferably 25% or more, more preferably 50% or more. From the viewpoint of improving the oxidation resistance, it is further preferred that all hydrogen atoms are substituted with halogen atoms.

Halogenated cyclic acid anhydrides may be used alone or in combination of two or more kinds.

Specific examples of halogenated cyclic acid anhydrides include, but not limited, the compounds described in Table 1.

TABLE 1

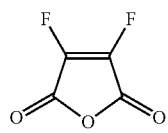

No. 1

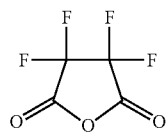 [SMILES: O=C1OC(=O)C(F)(F)C1(F)F]

No. 2

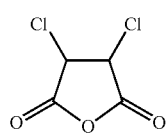

No. 3

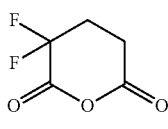

No. 4

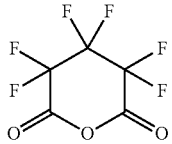

No. 5

In the present embodiment, in addition to the halogenated cyclic acid anhydrides, other halogenated acid anhydride may be contained. Other halogenated acid anhydrides include open-chain halogenated acid anhydrides.

Examples of open-chain halogenated acid anhydrides include halogenated compounds of carboxylic acid anhydrides such as acetic anhydride, propionic anhydride, butyric anhydride, crotonic anhydride and benzoic anhydride, for example, monofluoroacetic anhydride, trifluoroacetic anhydride, pentafluoropropionic anhydride; halogenated compounds of sulfonic acid anhydrides such as methanesulfonic anhydride, ethanesulfonic anhydride, propanesulfonic anhydride, butanesulfonic anhydride, pentanesulfonic anhydride, hexanesulfonic anhydride, vinylsulfonic anhydride and benzenesulfonic anhydride, for example, trifluoromethanesulfonic anhydride, 2,2,2-trifluoroethane sulfonic anhydride, pentafluoroethanesulfonic anhydride; halogenated compounds of anhydrides of carboxylic acids and sulfonic acids such as acetic methanesulfonic anhydride, acetic ethanesulfonic anhydride, acetic sulfonic anhydride, propionic methanesulfonic anhydride, propionic ethanesulfonic anhydrides and propionic propanesulfonic anhydride, for example, trifluoroacetic methanesulfonic anhydride, trifluoroacetic ethanesulfonic anhydride, trifluoroacetic propanesulfonic anhydride, acetic trifluoromethanesulfonic anhydride, acetic 2,2,2-trifluoroethane sulfonic anhydride, acetic pentafluoroethane sulfonic anhydride, trifluoroacetic trifluoromethanesulfonic anhydride, trifluoroacetic 2,2,2-trifluoroethanesulfonic anhydride, trifluoroacetic pentafluoroethanesulfonic anhydride.

Among them, preference is given to halogenated carboxylic acid anhydrides, and more preference is given to compounds represented by the following formula (II).

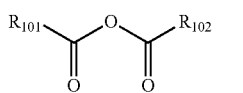
(II)

In the formula (II), $R_{101}$ and $R_{102}$ each independently represent a substituted or unsubstituted alkyl group having 1 to 6 carbon atoms, a substituted or unsubstituted aryl group having 6 to 12 carbon atoms, a substituted or unsubstituted heterocyclic group having 4 to 12 carbon atoms, or a substituted or unsubstituted alkenyl group having 2 to 6 carbon atoms, wherein, at least one of the hydrogen atoms in $R_{101}$ and $R_{102}$ is replaced by halogen atom.)

In $R_{101}$ and $R_{102}$ of the formula (II), the number of carbon atoms in the alkyl group is preferably 1, 2, 3, 4 or 5, more preferably 1, 2, 3 or 4. The number of carbon atoms in the aryl group is preferably 6, 7, 8, 9 or 10. Examples of aryl groups include phenyl group, benzyl group, tolyl group and xylyl group. The number of carbon atoms in the heterocyclic group is preferably 4, 5, 6, 7, 8, 9 or 10, and more preferably 4, 5, 6, 7 or 8. Heterocyclic group comprises at least one hetero atom such as, oxygen, nitrogen and sulfur, and the examples thereof include pyrrolyl group, pyridinyl group, furyl group, thienyl group and morpholino group. The number of carbon atoms in the alkenyl group is preferably 2, 3, 4 or 5, more preferably 2, 3 or 4. Further, the alkyl group or alkenyl group may be straight chain or branched.

In formula (II), $R_{101}$ and $R_{102}$ are each independently more preferably an alkyl group having 1 to 5 carbon atoms. Alkyl group may be straight chain or branched. The number of carbon atoms in the alkyl group is more preferably 1, 2, 3 or 4.

The substituents for $R_{101}$ and $R_{102}$ include, for example, alkyl group having 1 to 5 carbon atoms (for example, methyl group, ethyl group, propyl group, isopropyl group, butyl group), cycloalkyl group having 3 to 6 carbon atoms (for example, cyclopropyl group, cyclobutyl group, cyclopentyl group, cyclohexyl group), alkynyl group having 2 to 5 carbon atoms (for example, acetylenyl group, 1-propynyl group, 2-propynyl group, 2-butynyl group), alkoxy group having 1 to 5 carbon atoms (for example, methoxy group, ethoxy group, n-propoxy group, iso-propoxy group, n-butoxy group, tert-butoxy group), alkylcarbonyl group having 2 to 6 carbon atoms, arylcarbonyl group having 7 to 11 carbon atoms, alkoxycarbonyl group having 2 to 6 carbon atoms (for example, methoxycarbonyl group, ethoxycarbonyl group, tert-butoxycarbonyl group), aryloxycarbonyl group having 7 to 11 carbon atoms, alkylcarbonyloxy group having 2 to 6 carbon atoms, arylcarbonyloxy group having 7 to 11 carbon atoms, aryl group having 6 to 12 carbon atoms (for example, phenyl group, naphthyl group), aryloxy group having 6 to 10 carbon atoms (for example, phenoxy group, naphthoxy group), alkylthio group having 1 to 5 carbon atoms (for example, methylthio group, ethylthio group, n-propylthio group, iso-propylthio group, n-butylthio group, tert-butylthio group), arylthio group having 6 to 10 carbon atoms (for example, phenylthio group, naphthylthio group), alkylthiocarbonyl group having from 2 to 6 carbon atoms, arylthiocarbonyl group having 7 to 11 carbon atoms, alkylsulfinyl group having 1 to 5 carbon atoms, arylsulfinyl group having 6 to 10 carbon atoms, alkylsulfonyl group having 1 to 5 carbon atoms, arylsulfonyl group having 6 to 10 carbon atoms, heteroatom-containing aromatic cyclic group having 4 to 8 carbon atoms (for example, furyl group, thienyl group), amino group (including dimethylamino group, methylamino group), carboxy group, hydroxy group, cyano group, or halogen atom (for example, chlorine atom, bromine atom) and the like. $R_{101}$ and $R_{102}$ each independently may have one substituent or a plurality of substituents.

Open-chain halogenated carboxylic acid anhydride is particularly preferably halogenated compounds of acetic anhydride, propionic anhydride or butyric anhydride.

The content of the halogenated acid anhydride containing at least halogenated cyclic acid anhydrides in the electrolyte solution is, but not particularly limited, preferably 0.005 to 10 mass %. When the content of the halogenated acid anhydride is 0.005 mass % or more, it is possible to effectively form a film of the halogenated acid anhydride. Further, water in the negative electrode is effectively captured. Further, when the content of halogenated acid anhydride of 10 mass % or less, it is possible to prevent the film from being formed thick by the decomposition of the halogenated acid anhydride, and the increase in resistance due to the film is suppressed. The content of the halogenated acid anhydride in the electrolyte solution is more preferably 0.01 mass % or more, further more preferably 0.1 mass % or more, particularly preferably 0.5 mass % or more. The content of the halogenated acid anhydride in the electrolyte solution is more preferably 8 mass % or less, more preferably 5 mass % or less, and particularly preferably 3 mass % or less.

Further, the electrolyte solution may also optionally comprise additives other than halogenated acid anhydrides. Other additives include, for example, overcharge-preventing agents, surface active agents and the like.

<Nonaqueous Solvent>

The nonaqueous solvent comprises a compound of low viscosity in an amount of more than 50% by volume in the nonaqueous solvent (hereinafter, also referred to as low viscosity solvent). In the present embodiment, the viscosity of the low viscosity solvent is preferably 1.0 mPa·s or less. The lower limit of the viscosity of the low viscosity solvent is not particularly limited, but in general, it is preferably 0.1 mPa·s or more. In the present specification, the viscosity is the value at room temperature (typically 25° C.).

The low viscosity solvents having a viscosity of 1.0 mPa·s or less include, but are not particularly limited, for example, open-chain carbonates such as dimethyl carbonate (DMC), diethyl carbonate (DEC), ethyl methyl carbonate (EMC), methyl propyl carbonate (MPC); open-chain carboxylic acid esters such as methyl formate, ethyl formate, methyl acetate, ethyl acetate, propyl acetate, methyl propionate, ethyl propionate, methyl butyrate, methyl isobutyrate, methyl trimethylacetate and ethyl trimethylacetate; open-chain amides such as N, N-dimethyl acetamide; open-chain carbamic acid esters such as methyl N, N-diethylcarbamate and ethyl N, N-diethylcarbamate; ethers such as diethyl ether, 1,2-dimethoxyethane, tetrahydrofuran, tetrahydropyran and 1,3-dioxolane; and acetonitrile, and the like. These low viscosity solvents may be used alone or may be used in mixture of plural kinds.

Among these, open-chain carbonates such as DMC, DEC, EMC and MPC are preferred, and particularly, open-chain carbonates such as DMC, DEC and EMC are preferred.

The proportion of these solvents in the total solvent is generally more than 50 vol % in the nonaqueous solvent, preferably 60 vol % or more, more preferably 65 vol % or more, and particularly preferably 70 vol % or more. Also, it may be 100 vol %, preferably 90 vol % or less, more preferably 80 vol % or less, and further preferably 75 vol % or less.

The nonaqueous solvent may include other nonaqueous solvent in addition to the low viscosity solvent described above. Other nonaqueous solvents include, but not particularly limited, for example, carbonates such as cyclic carbonates, γ-lactones, cyclic ethers, and their fluorine derivatives, and the like. These can be used alone or in combination of two or more.

The cyclic carbonates include, for example, propylene carbonate (PC), ethylene carbonate (EC), butylene carbonate (BC), vinylene carbonate (VC) and the like. Since the cyclic carbonates have generally high viscosity, the content thereof is preferably less than 50 vol % in the nonaqueous solvent, and more preferably 40 vol % or less, more preferably 35% vol % or less.

The γ-lactones include, for example, γ-butyrolactone.

The cyclic ethers include, for example, 2-methyltetrahydrofuran, and the like.

Other examples of the nonaqueous solvent include, for example, dimethyl sulfoxide, ethyl monoglyme, phosphoric acid triester, dioxolane derivatives, sulfolane, methyl sulfolane, 1,3-dimethyl-2-imidazolidinone, 3-methyl-2-oxazolidinone, propylene carbonate derivatives, N-methylpyrrolidone, fluorinated carboxylic acid esters, methyl-2,2,2-trifluoroethyl carbonate, methyl-2,2,3,3,3-pentafluoropropyl carbonate, trifluoromethylethylene carbonate, monofluoromethylethylene carbonate, difluoromethyl ethylene carbonate, 4,5-difluoro-1,3-dioxolan-2-one, monofluoroethylene carbonate, and the like. These may be used alone or in combination of two or more.

The nonaqueous solvent preferably comprises carbonates, in addition to the low viscosity solvent described above or as at least a part of the low viscosity solvent. The carbonates may include cyclic carbonates and open-chain carbonates. Since carbonates have relative high dielectric constant, they improve the ion dissociation of the electrolyte solution. However, if a carbonate having carbonate structural is used as a nonaqueous solvent of the electrolyte solution, the carbonate tends to decompose to generate gas containing $CO_2$. In particular, in the case of the secondary battery of the layered laminate type, gas generation inside the battery leads to a remarkable problem of swelling, which easyly leads to performance degradation. Therefore, in the present embodiment, if the halogenated acid anhydride compound of the present embodiment in the nonaqueous solvent containing carbonates is added, a SEI film suppresses the decomposition of carbonates and therefore the generation of gas is suppressed.

<Supporting Salt>

Examples of supporting salt include, but not particularly limited, lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$ and the like. Supporting salts may be used alone or in combination of two or more.

The concentration of supporting salt in the electrolyte is preferably 0.5 to 1.5 mol/l. By setting the concentration of the supporting salt in this range, density, viscosity and electrical conductivity and the like may be easily adjusted within appropriate ranges.

[2] Negative Electrode

A secondary battery of the present embodiment comprises a negative electrode having a negative electrode active material. The negative electrode active material is bound to a negative electrode current collector by a negative electrode binder. As the negative electrode, an example that may be used is those obtained by forming, on the negative electrode current collector, a negative electrode active material layer containing a negative electrode active material and a negative electrode binder.

For example, the negative electrode in the present embodiment can be arranged to have a negative electrode current collector formed of a metal foil, and a negative electrode active material layer applied to one surface or both surfaces of the negative electrode current collector. The negative electrode active material layer is formed so as to cover the negative electrode current collector by a binder for a negative electrode. The negative electrode current collector is arranged to have an extended portion connected to a negative electrode terminal, and the negative electrode active material layer is not applied to this extended portion.

Examples of the negative electrode active material include, but not particularly limited, a metal (a) that can be alloyed with lithium, a metal oxide (b) that can absorb and desorb a lithium ion, and a carbon material (c) that can absorb and desorb a lithium ion. The negative electrode active materials may be used singly or in combination of two or more.

As the metal (a), Al, Si, Pb, Sn, In, Bi, Ag, Ba, Ca, Hg, Pd, Pt, Te, Zn, La, or an alloy containing two or more of these may be exemplified. Alternatively, it may be used by mixing two or more of these metals and alloys. These metals and alloys may comprise one or more non-metal elements. Among these, as the negative electrode active material, it is preferable to use silicon, tin, or alloy thereof. By using silicon or tin as the negative electrode active material, a lithium secondary battery which is excellent in weight energy density and volume energy density can be provided.

Examples of the metal oxide (b) include silicon oxide, aluminum oxide, tin oxide, indium oxide, zinc oxide, lithium oxide, or a composite thereof. Among these, silicon oxide as the negative electrode active material is preferably used. Moreover, the metal oxide (b) may contain one or two or more elements selected from nitrogen, boron and sulfur in amounts of, for example, 0.1 to 5 mass %.

Examples of the carbon material (c) include graphite, amorphous carbon, diamond-like carbon, a carbon nanotube, or a composite thereof. Highly crystalline graphite has high electric conductivity, and is excellent in adhesion to a current collector made of a metal such as copper and in voltage flatness. As the graphite, both of natural graphites and artificial graphites can be used. Among these, it is particularly preferable to use artificial graphite.

Examples of the negative electrode binder include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and polyacrylic acid, but the present invention is not limited to these.

The negative electrode can be produced by forming a negative electrode active material layer on a negative electrode current collector, wherein the negative electrode active material layer contains a negative electrode active material and a binder for negative electrode. The negative electrode active material layer can be formed with a general slurry applying method. Specifically, slurry containing a negative electrode active material, a binder and a solvent is prepared, and this slurry is applied on a negative electrode current collector, and then this is dried, optionally pressed to obtain a negative electrode. The applying method of the negative electrode slurry includes a doctor blade method, a die coater method and a dip coating method. After forming the negative electrode active material layer in advance, a thin film of copper, nickel or an alloy thereof is formed as a current collector by a method such as vapor deposition and sputtering, and thereby a negative electrode can also be obtained.

As the negative electrode binder, it is also preferred to use an aqueous dispersion-based polymer. The negative electrode binder may be used in the form of water-based dispersion. The examples of the aqueous dispersion-based polymers include styrene-butadiene based polymers, acrylic acid-based polymers, polytetrafluoroethylene, polyacrylates, polyurethanes and the like. These polymers may be used by dispersing in water. More specifically, the examples of aqueous dispersion-based polymers include, for example, natural rubber (NR), styrene-butadiene rubber (SBR), acrylonitrile-butadiene copolymer rubber (NBR), methyl methacrylate-butadiene copolymer rubber (MBR), chloroprene rubber (CR), acrylic rubber (ABR), styrene-butadiene-styrene copolymer (SBS), butyl rubber (IIR), Thiokol, urethane rubber, silicone rubber, or fluororubber. These may be used alone or in combination of two or more of these.

In the case of using an aqueous dispersion-based polymer as negative electrode binder, it is preferable to use an aqueous thickener. Examples of the aqueous thickeners include, for example, methyl cellulose, carboxymethyl cellulose (CMC), carboxymethyl cellulose sodium salt, carboxymethyl cellulose lithium salt, hydroxyethyl cellulose, polyethylene oxide, polyvinyl alcohol (PVA), polyvinyl pyrrolidone, sodium polyacrylate, polyacrylic acid, polyethylene glycol, and polyethylene oxide. These may be used alone or in combination of two or more of these.

The amount of the negative electrode binder is preferably 1 to 25 parts by mass, more preferably 1 to 10 parts by mass based on 100 parts by mass of the negative electrode active material.

The amount of the aqueous thickener is, for example, preferably 0.1 to 5.0 parts by mass, more preferably 0.5 to 3.0 parts by mass based on 100 parts by mass of the negative electrode active material.

Although water is preferably used as a dispersion medium, the dispersion medium may comprise, in addition to water, water-soluble solvents such as alcohol-based solvents, amine-based solvents, carboxylic acid-based solvents, ketone-based solvents.

The negative electrode can be produced, for example, as follows. First, a negative electrode active material, an aqueous thickener, an aqueous dispersion-based polymer, and water are mixed and kneaded, to prepare a negative electrode slurry. Next, the aqueous slurry was applied on the negative electrode current collector, dried and pressed, to prepare a negative electrode.

As a negative electrode current collector, aluminum, nickel, copper, silver, and an alloy containing two or more of these metals are preferable. Examples of its shape include foil, plate-like and mesh-like.

From the viewpoint of improving the conductivity, the negative electrode active material layer may comprise carbon and the like, for example, a conductive assisting agent such as carbonaceous fine particles of graphite, carbon black, acetylene black and the like.

Negative electrode slurry may comprise other components as necessary, and the examples thereof include surfactants, defoaming materials and the like. If the negative electrode slurry contains a surfactant, the dispersion stability of the negative electrode binder is improved. Further, if the negative electrode slurry contains a defoaming agent, foaming of the slurry containing a surfactant is suppressed when it is applied.

[3] Positive Electrode

The secondary battery of the present embodiment comprises a positive electrode comprising a positive electrode active material. The positive electrode active material can be bound on the positive electrode current collector by a positive electrode binder. As the positive electrode, an example that may be used is those obtained by forming, on the positive electrode current collector, a positive electrode active material layer containing a positive electrode active material and a positive electrode binder.

For example, the positive electrode in the present embodiment can be arranged to have a positive electrode current collector formed of a metal foil, and a positive electrode active material layer applied to one surface or both surfaces of the positive electrode current collector. The positive electrode active material layer is formed so as to cover the positive electrode current collector by a binder for a positive electrode. The positive electrode current collector is arranged to have an extended portion connected to a positive electrode terminal, and the positive electrode active material layer is not applied to this extended portion.

As the positive electrode active material, it is not particularly limited, and examples thereof include lithium composite oxides and lithium iron phosphate. Those in which at least part of the transition metal of these lithium composite oxides are replaced with other elements may be used. It is also possible to use a lithium composite oxide having a plateau at 4.2 V or higher as potential versus lithium metal counter electrode. As the lithium composite oxide, the examples include spinel type lithium manganese complex oxide, olivine type lithium-containing composite oxide, inverse spinel type lithium-containing composite oxide, and the like.

The positive electrode active material is not particularly limited, and the examples thereof include lithium manganate having a layered structure or lithium manganate having a spinel structure such as $LiMnO_2$ or $Li_xMn_2O_4$ ($0<x<2$), or those in which a part of the Mn of these lithium manganates is replaced by at least one element selected from the group consisting of Li, Mg, Al, Co, B, Ti, and Zn; lithium cobaltate such as $LiCoO_2$, or those in which a part of the Co of lithium cobaltate is replaced by at least one element selected from the group consisting of Ni, Al, Mn, Mg, Zr, Ti, and Zn; lithium nickelate such as $LiNiO_2$, or those in which a part of the Ni of lithium nickelate is replaced by at least one element selected from the group consisting of Co, Al, Mn, Mg, Zr, Ti, and Zn; lithium transition metal oxides in which particular transition metals do not exceed half, such as $LiNi_{1/3}Co_{1/3}Mn_{1/3}O_2$, or those in which a part of the transition metals of the lithium transition metal oxides are replaced by at least one element selected from the group consisting of Co, Al, Mn, Mg, and Zr; and these lithium transition metal oxides in which Li is excessive as compared with the stoichiometric composition. Particularly, as the lithium composite oxides, $Li_\alpha Ni_\beta Co_\gamma Al_\delta O_2$ ($1 \le \alpha \le 1.2$, $\beta+\gamma+\delta=1$, $\beta \ge 0.7$, and $\gamma \le 0.2$), or $Li_\alpha Ni_\beta Co_\gamma Mn_\delta O_2$ ($1 \le \alpha \le 1.2$, $\beta+\gamma+\delta=1$, $\beta \ge 0.5$, and $\gamma \le 0.4$), or those in which a part of the transition metals of these composite oxides are replaced by at least one element selected from the group consisting of Al, Mg, and Zr are preferred. One of these lithium composite oxides may be used alone, or two or more of these lithium composite oxides may be used in combination.

Among them, from the viewpoint of achieving higher energy density, a high capacity compound is preferably contained. Examples of the high capacity compound include lithium acid nickel ($LiNiO_2$), or lithium nickel composite oxides in which a part of the Ni of lithium acid nickel is replaced by another metal element, and layered lithium nickel composite oxides represented by the following formula (A) are preferred.

$$Li_yNi_{(1-x)}M_xO_2 \tag{A}$$

wherein 0≤x<1, 0<y≤1.2, and M is at least one element selected from the group consisting of Co, Al, Mn, Fe, Ti, and B.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ (0<α≤1.2, preferably 1≤α≤1.2, β+γ+δ=1, 0.2≤β≤0.5, 0.1≤γ≤0.4, and 0.1≤δ≤0.4). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including these compounds in which the content of each transition metal fluctuates by about 10%).

In addition, from the viewpoint of high capacity, it is preferred that the content of Ni is high, that is, x is less than 0.5, further preferably 0.4 or less in the formula (A). Examples of such compounds include $Li_\alpha Ni_\beta Co_\gamma Mn_\delta O_2$ (0≤α≤1.2, preferably 1≤α≤1.2, β+γ+δ=1, 0≤γ≤0.7, and γ≤0.2) and $Li_\alpha Ni_\beta Co_\gamma Al_\delta O_2$ (0<α≤1.2, preferably 1≤α≤1.2, β+γ+δ=1, β≥0.7, and γ≤0.2) and particularly include $Li_\alpha Ni_\beta Co_\gamma Mn_\delta O_2$ (0.75≤β≤0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.10}O_2$ may be preferably used.

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

As the lithium composite oxide, compounds represented by the following formula may be preferably exemplified.

$$Li_a(M_xMn_{2-x})O_4$$

(In the above formula, x satisfies 0<x<2, a satisfies 0<a<1.2, M is at least one element selected from the group consisting of Ni, Co, Fe, Cr and Cu.)

In addition, as the positive electrode active material, active materials that operate at a potential of 4.5 V or more versus lithium (hereinafter also referred to as 5 V class active materials) can be used from the viewpoint that high voltage is obtained. In case that the 5 V class active materials are used, gas generation due to decomposition of the electrolyte solution tends to occur. However, the use of the electrolyte solution containing the compound of the present embodiment suppresses the gas generation.

As the 5 V class active materials, for example, lithium manganese composite oxides represented by the following formula (A) may be used.

$$Li_a(M_xMn_{2-x-y}Y_y)(O_{4-w}Z_w) \tag{A}$$

wherein in the formula (A), 0.4≤x≤1.2, 0≤y, x+y<2, 0≤a≤1.2, and 0≤w≤1; M is at least one selected from the group consisting of Co, Ni, Fe, Cr, and Cu; Y is at least one selected from the group consisting of Li, B, Na, Mg, Al, Ti, Si, K, and Ca; and Z is at least one selected from the group consisting of F and Cl.

In addition, as the 5 V class active materials, among such metal composite oxides, spinel type compounds represented by the following formula (B) are preferably used from the viewpoint of obtaining sufficient capacity and achieving longer life.

$$LiNi_xMn_{2-x-y}A_yO_4 \tag{B}$$

wherein in the formula (B), 0.4<x<0.6, 0≤y<0.3, and A is at least one selected from the group consisting of Li, B, Na, Mg, Al, Ti, and Si.

In the formula (B), 0≤y<0.2 is more preferred.

Examples of the spinel type compounds include $Li_xMn_{1.5}Ni_{0.5}O_4$ (0<x<2).

In addition, examples of the active materials that operate at a potential of 4.5 V or more versus lithium include Si composite oxides. Examples of such Si composite oxides include compounds represented by the following formula (C):

$$Li_2MSiO_4 \tag{C}$$

wherein in the formula (C), M is at least one selected from the group consisting of Mn, Fe, and Co.

In addition, the active materials that operate at a potential of 4.5 V or more versus lithium may comprise layered structures. Examples of the 5 V class active materials comprising layered structures include compounds represented by the following formula (D):

$$Li(M1_xM2_yMn_{1-x-y})O_2 \tag{D}$$

wherein in the formula (D), M1 is at least one selected from the group consisting of Ni, Co, and Fe; and M2 is at least one selected from the group consisting of Li, Mg, and Al, 0.1<x<0.5, and 0.05<y<0.3.

As the 5 V class active materials, lithium metal composite oxides represented by the following (E) to (G) may be used.

Olivine-Type Material:

$$LiMPO_4 \tag{E}$$

wherein in the formula (E), M is at least one selected from the group consisting of Co and Ni.

$$Li(M_yMn_z)O_2 \tag{F}$$

wherein in the formula (F), 0.1≤y≤0.67, preferably y≤0.5, 0.33≤z≤0.9, preferably z≤0.7, y+z=1, and M is at least one selected from the group consisting of Li, Co, and Ni.

$$Li(Li_xM_yMn_z)O_2 \tag{G}$$

wherein in the formula (G), 0.1≤x<0.3, 0.1≤y≤0.4, 0.33≤z≤0.7, x+y+z=1, and M is at least one selected from the group consisting of Li, Co, and Ni.

All the above-described positive electrode active materials may be used alone or in combinations of two or more. The combination of two or more is not particularly limited, and the examples thereof include a combination of two or more layered lithium-nickel composite oxides, a combination of a layered lithium composite oxide and a spinel-type lithium composite oxide, and the like.

The positive electrode can be produced, for example, as follows. Firstly, a positive electrode slurry containing a positive electrode active material, a binder and a solvent (if further necessary, a conductive assisting agent) is prepared. This positive electrode slurry is applied on a positive electrode current collector, dried and optionally pressed to form a positive electrode active material layer on the positive electrode current collector, and as a result, a positive electrode is produced.

As the positive electrode binder, the same materials as mentioned for the negative electrode binder can be used.

Polyvinylidene fluoride is preferred from the viewpoint of versatility and low cost. The amount of the positive electrode binder is preferably 1 to 25 parts by mass, more preferably 2 to 20 parts by mass, further more preferably 2 to 10 parts by mass based on 100 parts by mass of the positive electrode active material, from the viewpoint of the binding strength and energy density being in a trade-off relation with each other. Examples of the binder other than polyvinylidene fluoride (PVdF) include vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide. As the solvent, N-methyl-2-pyrrolidone (NMP) may be used.

The positive electrode current collector is not particularly limited, but the examples thereof include aluminum, titanium, tantalum, nickel, silver, or alloys thereof. The shape of the positive electrode current collector include foil, flat plate, mesh and the like. As the positive electrode current collector, aluminum foil is preferably used.

In the preparation of the positive electrode, conductive assisting agents may be added for the purpose of lowering the impedance. As the conductive assisting agents, carbonaceous fine particles of graphite, carbon black, acetylene black and the like are exemplified.

[4] Separator

As a separator, porous films or non-woven fabrics formed of polypropylene, polyethylene, or the like may be used, but the present invention is not particularly limited to these. As a separator, it is also possible to use a ceramic-coated separator obtained by forming a coating containing a ceramic on a polymer substrate used as a separator. In addition, these may be stacked and used as a separator.

Examples of the separator that can be used include webs and sheets formed of organic materials, for example, woven fabrics and nonwoven fabrics of polyamides, polyimides, cellulose and the like, porous polymer films of polyolefines such as polyethylene and polypropylene, polyamides, polyimides, porous polyvinylidene fluoride and the like or ion-conducting polymer electrolyte membrane or the like. These may be used alone or in combination.

Further, as a separator, it is also possible to use a separator formed of an inorganic material such as ceramic or glass. The examples of inorganic separators include:

nonwoven fabric separators formed of ceramic short fibers such as alumina, alumina-silica, potassium titanate, and the like;

separators comprising a substrate of a woven fabric, a nonwoven fabric or a porous film, and a layer containing a heat-resistant nitrogen-containing aromatic polymer and a ceramic powder;

porous thin film layer separators in which a heat-resistant layer is provided on a part of the surface, wherein the heat-resistant layer is formed of a porous thin layer containing ceramic powder, a porous thin layer of a heat-resistant resin, or a composite of ceramic powder and heat-resistant resin;

separators comprising a layer of a porous film in which secondary particles formed by sintering or dissolving-recrystallizing a part of primary particles of a ceramic material are bound by a binder;

separators comprising a substrate layer formed of a polyolefin porous film and a heat resistant insulating layer formed on one side or both sides of the base material layer, wherein the heat resistant insulating layer comprises an oxidation resistant ceramic particle and a heat resistant resin;

separators comprising a porous film formed by binding a ceramic material and a binder, wherein the ceramic material is selected from silica ($SiO_2$), alumina ($Al_2O_3$), zirconium oxide ($ZrO_2$), titanium oxide ($TiO_2$), nitrides of silicon (Si), hydroxides of aluminum (Al), alkoxides of zirconium (Zr) and ketone compounds of titanium (Ti); and separators comprising a polymer substrate and a ceramic-containing coating layer of $Al_2O_3$, MgO, $TiO_2$, $Al(OH)_3$, $Mg(OH)_2$, $Ti(OH)_4$ formed on the polymer substrate; and the like.

[5] Package

The package is not particularly limited but, for example, a laminate film may be used. For example, in the case of a stacked laminate type secondary battery, a laminate film made of polypropylene, polyethylene, or the like, coated with aluminum or silica, may be used.

In the case of a secondary battery using a laminate film as a package, when a gas is generated, the strain of the electrode stack is very large compared with a secondary battery using a metal can as a package. This is because the laminate film deforms easily by the internal pressure of the secondary battery compared with the metal can. Further, when the secondary battery using the laminate film as the package is sealed, usually, the battery internal pressure is set lower than atmospheric pressure, and therefore there is no extra space inside, and when a gas is generated, it easily immediately leads to the volume change of the battery and the deformation of the electrode stack. The secondary battery according to the present embodiment can overcome such problems, however, by using the electrolyte solution comprising the compounds in the present embodiment.

[6] Secondary Battery

Examples of the structure of a secondary battery according to the present embodiment include a structure in which an electrode stack having a positive electrode and a negative electrode disposed so as to oppose each other and an electrolyte, are enclosed in the package, but the present invention is not particularly limited to this.

Figure 2:
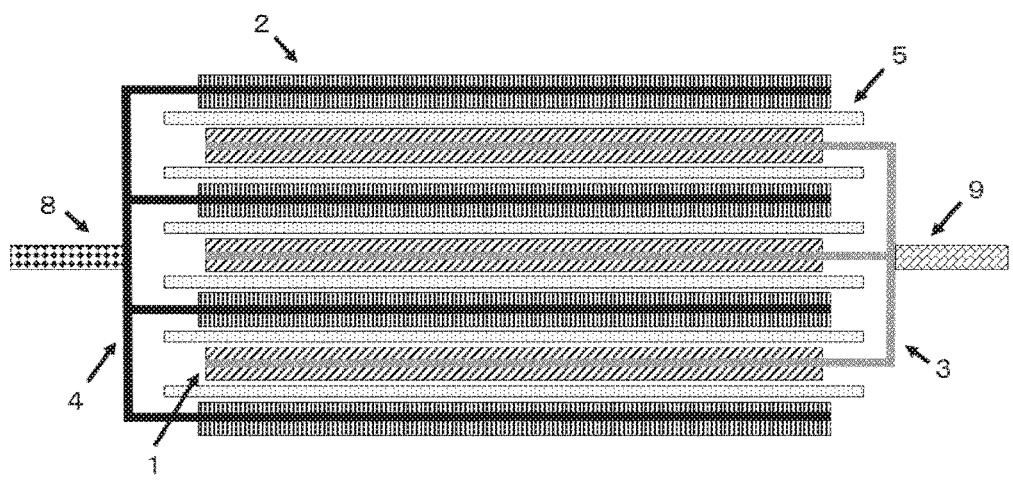
FIG. 2 is a schematic sectional view showing the structure of an electrode element possessed by a laminate type secondary battery according to an embodiment of the present invention.

Herein below, a lithium ion secondary battery of the stacked laminate-type is explained as an example. FIG. 1 is a schematic diagram showing an example of the basic structure of a secondary battery according to the present embodiment. In the positive electrode, a positive electrode active material layer 1 is formed on a positive electrode current collector 3. In the negative electrode, a negative electrode active material layer 2 is formed on a negative electrode current collector 4. These positive electrode and negative electrode are disposed so as to face each other with a porous separator 5 between them. The porous separator 5 is disposed generally parallel to the positive electrode active material layer 1 and the negative electrode active material layer 2. Pairs of the positive electrode and the negative electrode (also referred to as "electrode element" or "battery element") and the electrolyte solution are enclosed in packages 6 and 7. A positive electrode tab 9 that is connected to the positive electrode current collector 3, and a negative electrode tab 8 that is connected to the negative electrode current collector 4 are drawn out of the container. As shown in FIG. 2, the electrode pairs may have an arrangement in which a plurality of positive electrodes and a plurality of negative electrodes are stacked via separators. In addition, the positive electrode active material layer 1 and the negative electrode active material layer 2 may be provided on both surfaces of the current collectors respectively. The shape of the secondary battery according to the present embodiment is not particularly limited, but examples of the shape include a laminate packaging type, a cylindrical type, a prismatic type, a coin type and a button type. Further, the secondary battery according to the present embodiment may be formed into an assembled battery by combining plurality batteries.

Figure 3:
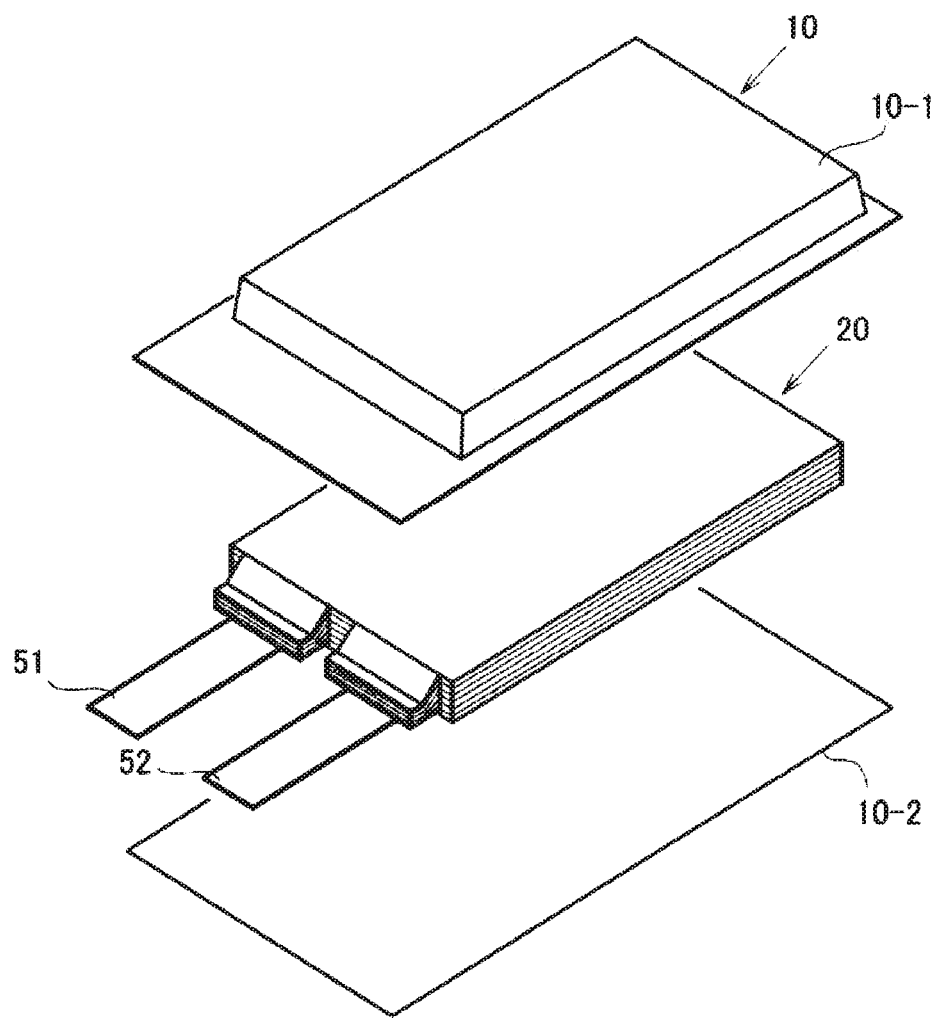
FIG. 3 is a perspective sectional view showing a basic structure of a film package battery.
Figure 4:
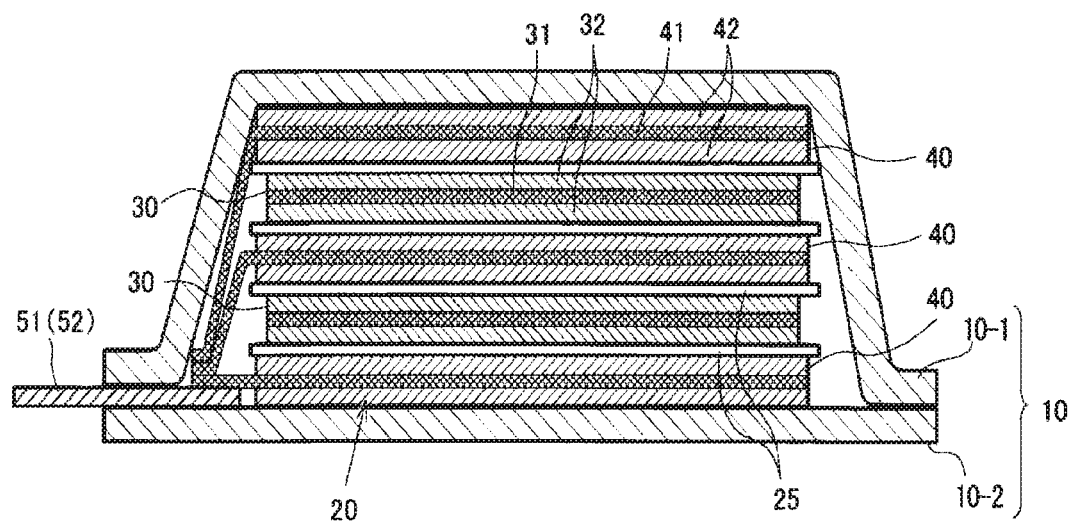
FIG. 4 is a schematic sectional view of the battery shown in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

The secondary battery and the assembled battery as described herein can be suitably used as a motor driving power source used for vehicle applications such as an automobile, and also a storage battery for use in household energy storage system or a solar power system.

EXAMPLES

Hereafter, an embodiment of the present invention will be explained in details by using examples, but the present invention is not limited to these examples.

Examples 1 to 5, Comparative Examples 1 to 5

Example 1

<Negative Electrode>

As a negative electrode active material, natural graphite is used. The negative electrode active material, styrene-butadiene copolymer rubber (SBR) as a negative electrode binder, carboxymethyl cellulose (CMC) as a thickener, and acetylene black as a conductive assisting agent were weighed so that the mass ratio becomes 96:2:1:1. Herein, as the SBR, rubber particles dispersion (solid content 40 wt %) was used, and was weighed so that the solid content of the binder becomes the above mass ratio.

Then, these were mixed with water to prepare a negative electrode slurry. After the negative electrode slurry was applied on a copper foil having a thickness of 10 µm, it was dried by performing heat treatment at 80° C. for 8 hours under a nitrogen atmosphere. Then, the negative electrode obtained was stored for 3 hours under environment having a dew point of −10° C. to obtain a negative electrode.

<Positive Electrode>

As a positive active material, a mixture of $LiMn_2O_4$ and $LiNi_{0.5}Co_{0.2}Mn_{0.3}O_2$ in a weight ratio of 3:7 was used. The positive electrode active material, carbon black as a conductive assisting agent, and polyvinylidene fluoride as a positive electrode binder were weighed so that a mass ratio becomes 90:5:5. Then, these were mixed with N-methylpyrrolidone to prepare a positive electrode slurry. The positive electrode slurry was applied on an aluminum foil having a thickness of 20 m, then it was dried and further pressed to prepare a positive electrode.

<Electrode Stack>

The obtained positive electrode and the negative electrode were stacked via a polypropylene porous film as a separator. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

<Electrolyte Solution>

Mixed solvent of the EC and DEC (volume ratio: EC/DEC=30/70) was used as a nonaqueous solvent. To the mixed solvent, halogenated acid anhydride represented by No. 1 in Table 1 was added so that the content in the electrolyte becomes 1 wt %, and $LiPF_6$ was added as a supporting salt so that the concentration in the electrolyte solution becomes 1M, to prepare an electrolyte solution.

<Secondary Battery>

The electrode stack was accommodated in an aluminum laminate film as a package, and then the electrolyte solution was injected inside the package. Thereafter, the package was sealed while the pressure was reduced to 0.1 atm, to prepare a lithium ion secondary battery.

<Evaluation>

(Volume Increase Ratio at 45° C. after 200 cycles)

To the fabricated secondary battery, one cycle of charge and discharge was conducted in a thermostat kept at 45° C. In the charge, the secondary battery was charged at 1 C to 4.15 V and then subjected to constant voltage charge for 1.5 hours in total. In the discharge, the secondary battery was subjected to constant current discharge at 1 C to 2.5 V. Then, to the secondary battery, 200 cycles of charge and discharge with the same condition as above was repeated, and volume increase ratio (%) was measured. The volume was measured using Archimedes method.

The "volume increase ratio (%)" was calculated by {(volume after 200 cycles of charge and discharge)/(volume before 200 cycles of charge and discharge (after one charge and discharge))−1}×100 (unit: %).

The results are shown in Table 2.

Example 2

A secondary battery was fabricated and evaluated as in Example 1 except that Compound No. 2 in Table 1 was used as halogenated acid anhydride in place of Compound No. 1. The results are shown in Table 2.

Example 3

A secondary battery was fabricated and evaluated as in Example 1 except that Compound No. 3 in Table 1 was used as halogenated acid anhydride in place of Compound No. 1. The results are shown in Table 2.

Example 4

A secondary battery was fabricated and evaluated as in Example 1 except that Compound No. 4 in Table 1 was used as halogenated acid anhydride in place of Compound No. 1. The results are shown in Table 2.

Example 5

A secondary battery was fabricated and evaluated as in Example 1 except that Compound No. 5 in Table 1 was used as halogenated acid anhydride in place of Compound No. 1. The results are shown in Table 2.

Comparative Example 1

A secondary battery was fabricated and evaluated as in Example 1 except that acetic anhydride was used in place of Compound No. 1 which is a halogenated acid anhydride. The results are shown in Table 2.

Comparative Example 2

A secondary battery was fabricated and evaluated as in Example 1 except that succinic anhydride was used in place of Compound No. 1 which is a halogenated acid anhydride. The results are shown in Table 2.

Comparative Example 3

A secondary battery was fabricated and evaluated as in Example 1 except that Comparative compound No. 1 represented by the following formula was used as halogenated acid anhydride in place of Compound No. 1. The results are shown in Table 2.

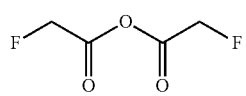

Comparative Example 4

A secondary battery was fabricated and evaluated as in Example 1 except that Comparative compound No. 2 represented by the following formula was used as halogenated acid anhydride in place of Compound No. 1. The results are shown in Table 2.

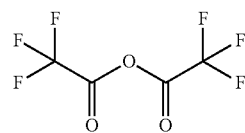 [SMILES: O=C(OC(=O)C(F)(F)F)C(F)(F)F]

Comparative Example 5

A secondary battery was fabricated and evaluated as in Example 1 except that Comparative compound No. 3 represented by the following formula was used as halogenated acid anhydride in place of Compound No. 1. The results are shown in Table 2.

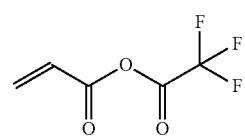

TABLE 2

| | Additive | Volume Increase Ratio at 45° C. after 200 cycles (%) |
|---|---|---|
| Example 1 | No. 1 | 1.1 |
| Example 2 | No. 2 | 0.5 |
| Example 3 | No. 3 | 2.1 |
| Example 4 | No. 4 | 1.8 |
| Example 5 | No. 5 | 0.7 |
| Comparative Example 1 | acetic anhydride | 7.5 |
| Comparative Example 2 | succinic anhydride | 7 |
| Comparative Example 3 | Comparative compound No. 1 | 3.6 |
| Comparative Example 4 | Comparative compound No. 2 | 2.7 |
| Comparative Example 5 | Comparative compound No. 3 | 4 |

Compared with Comparative Examples 1 and 2, Examples 1 to 5 shows that the addition of an halogenated acid anhydride to the electrolyte solution reduces volume increase ratio of the secondary battery. Therefore, it is revealed that the addition of the halogenated acid anhydride can suppress gas generation. In Examples 1 to 5 using cyclic halogenated acid anhydrides, effect of suppressing gas generation is higher, compared with Comparative Examples 3 to 5 using open-chain halogenated acid anhydrides. This is presumed that when an open-chain compound is used, the terminal group tends to be easily eliminated to generate gas.

Examples 6 to 10, Comparative Examples 6 to 10

Example 6

A secondary battery was fabricated and evaluated as in Example 1 except that, as a positive active material, $LiNi_{0.5}Co_{0.2}Mn_{0.3}O_2$ was used alone in place of a mixture of LiMn$_2$O$_4$ and LiNi$_{0.5}$Co$_{0.2}$Mn$_{0.3}$O$_2$ in a weight ratio of 3:7. The results are shown in Table 2.

Example 7

A secondary battery was fabricated and evaluated as in Example 6 except that Compound No. 2 in Table 1 was used as halogenated acid anhydride in place of Compound No. 1. The results are shown in Table 3.

Example 8

A secondary battery was fabricated and evaluated as in Example 6 except that Compound No. 3 in Table 1 was used as halogenated acid anhydride in place of Compound No. 1. The results are shown in Table 3.

Example 9

A secondary battery was fabricated and evaluated as in Example 6 except that Compound No. 4 in Table 1 was used as halogenated acid anhydride in place of Compound No. 1. The results are shown in Table 3.

Example 10

A secondary battery was fabricated and evaluated as in Example 6 except that Compound No. 5 in Table 1 was used as halogenated acid anhydride in place of Compound No. 1. The results are shown in Table 3.

Comparative Example 6

A secondary battery was fabricated and evaluated as in Example 6 except that acetic anhydride was used in place of Compound No. 1 which is a halogenated acid anhydride. The results are shown in Table 3.

Comparative Example 7

A secondary battery was fabricated and evaluated as in Example 6 except that succinic anhydride was used in place of Compound No. 1 which is a halogenated acid anhydride. The results are shown in Table 3.

Comparative Example 8

A secondary battery was fabricated and evaluated as in Example 6 except that Comparative compound No. 1 represented by the following formula was used as halogenated acid anhydride in place of Compound No. 1. The results are shown in Table 3.

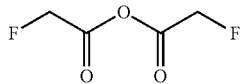

Comparative Example 9

A secondary battery was fabricated and evaluated as in Example 6 except that Comparative compound No. 2 represented by the following formula was used as halogenated acid anhydride in place of Compound No. 1. The results are shown in Table 3.

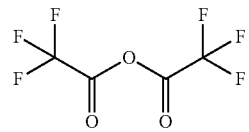 [SMILES: O=C(OC(=O)C(F)(F)F)C(F)(F)F]

Comparative Example 10

A secondary battery was fabricated and evaluated as in Example 6 except that Comparative compound No. 3 represented by the following formula was used as halogenated acid anhydride in place of Compound No. 1. The results are shown in Table 3.

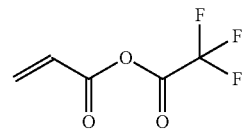

TABLE 3

|  | Additive | Volume Increase Ratio at 45° C. after 200 cycles (%) |
| --- | --- | --- |
| Example 6 | No. 1 | 1 |
| Example 7 | No. 2 | 0.5 |
| Example 8 | No. 3 | 2.3 |
| Example 9 | No. 4 | 1.6 |
| Example 10 | No. 5 | 0.8 |
| Comparative Example 6 | acetic anhydride | 7.8 |
| Comparative Example 7 | succinic anhydride | 7.1 |
| Comparative Example 8 | Comparative compound No. 1 | 3.4 |
| Comparative Example 9 | Comparative compound No. 2 | 2.9 |
| Comparative Example 10 | Comparative compound No. 3 | 3.5 |

Compared with Comparative Examples 6 and 7, Examples 6 to 10 shows that the addition of an halogenated acid anhydride to the electrolyte solution reduces volume increase ratio of the secondary battery. Therefore, it is revealed that the addition of the halogenated acid anhydride can suppress gas generation. In Examples 6 to 10 using cyclic halogenated acid anhydrides, effect of suppressing gas generation is higher, compared with Comparative Examples 8 to 10 using open-chain halogenated acid anhydrides. This is presumed that when an open-chain compound is used, the terminal group tends to be easily eliminated to generate gas.

Examples 11 to 14, Comparative Examples 11 to 18

Example 11

A secondary battery was fabricated and evaluated as in Example 1. The results are shown in Table 4.

Example 12

A secondary battery was fabricated and evaluated as in Example 1 except that Compound No. 5 in Table 1 was used as halogenated acid anhydride in place of Compound No. 1. The results are shown in Table 4.

Example 13

A secondary battery was fabricated and evaluated as in Example 1 except that a mixed solvent of EC and DEC (volume ratio: EC/DEC=40/60) was used as solvent of the nonaqueous electrolyte solution. The results are shown in Table 4.

Example 14

A secondary battery was fabricated and evaluated as in Example 1 except that a mixed solvent of EC and DEC (volume ratio: EC/DEC=40/60) was used as solvent of the nonaqueous electrolyte solution and Compound No. 5 in Table 1 was used as halogenated acid anhydride in place of Compound No. 1. The results are shown in Table 4.

Comparative Example 11

A secondary battery was fabricated and evaluated as in Example 1 except that a mixed solvent of EC and DEC (volume ratio: EC/DEC=50/50) was used as solvent of the nonaqueous electrolyte solution. The results are shown in Table 4.

Comparative Example 12

A secondary battery was fabricated and evaluated as in Example 1 except that a mixed solvent of EC and DEC (volume ratio: EC/DEC=50/50) was used as solvent of the nonaqueous electrolyte solution and Compound No. 5 in Table 1 was used as halogenated acid anhydride in place of Compound No. 1. The results are shown in Table 4.

Comparative Example 13

A secondary battery was fabricated and evaluated as in Example 1 except that a mixed solvent of EC and DEC (volume ratio: EC/DEC=30/70) was used as solvent of the nonaqueous electrolyte solution and acetic anhydride was used in place of Compound No. 1 which is a halogenated acid anhydride. The results are shown in Table 4.

Comparative Example 14

A secondary battery was fabricated and evaluated as in Example 1 except that a mixed solvent of EC and DEC (volume ratio: EC/DEC=30/70) was used as solvent of the nonaqueous electrolyte solution and succinic anhydride was used in place of Compound No. 1 which is a halogenated acid anhydride. The results are shown in Table 4.

Comparative Example 15

A secondary battery was fabricated and evaluated as in Example 1 except that a mixed solvent of EC and DEC (volume ratio: EC/DEC=40/60) was used as solvent of the nonaqueous electrolyte solution and acetic anhydride was used in place of Compound No. 1 which is a halogenated acid anhydride. The results are shown in Table 4.

Comparative Example 16

A secondary battery was fabricated and evaluated as in Example 1 except that a mixed solvent of EC and DEC (volume ratio: EC/DEC=40/60) was used as solvent of the nonaqueous electrolyte solution and succinic anhydride was used in place of Compound No. 1 which is a halogenated acid anhydride. The results are shown in Table 4.

Comparative Example 17

A secondary battery was fabricated and evaluated as in Example 1 except that a mixed solvent of EC and DEC (volume ratio: EC/DEC=50/50) was used as solvent of the nonaqueous electrolyte solution and acetic anhydride was used in place of Compound No. 1 which is a halogenated acid anhydride. The results are shown in Table 4.

Comparative Example 18

A secondary battery was fabricated and evaluated as in Example 1 except that a mixed solvent of EC and DEC (volume ratio: EC/DEC=50/50) was used as solvent of the nonaqueous electrolyte solution and succinic anhydride was used in place of Compound No. 1 which is a halogenated acid anhydride. The results are shown in Table 4.

TABLE 4

| | Additive | Content of DEC in solvent of electrolyte solution (%) | Volume Increase Ratio at 45° C. after 200 cycles (%) |
|---|---|---|---|
| Example 11 | No. 1 | 70 | 1.1 |
| Example 12 | No. 5 | 70 | 0.7 |
| Example 13 | No. 1 | 60 | 3.4 |
| Example 14 | No. 5 | 60 | 3 |
| Comparative Example 11 | No. 1 | 50 | 8 |
| Comparative Example 12 | No. 5 | 50 | 7.8 |
| Comparative Example 13 | acetic anhydride | 70 | 7.5 |
| Comparative Example 14 | succinic anhydride | 70 | 7 |
| Comparative Example 15 | acetic anhydride | 60 | 7.8 |
| Comparative Example 16 | succinic anhydride | 60 | 7.2 |
| Comparative Example 17 | acetic anhydride | 50 | 8 |
| Comparative Example 18 | succinic anhydride | 50 | 7.3 |

As shown in Table 4, among the secondary batteries comprising a electrolyte solvent with DEC ratio of 60 vol % or more in the electrolyte solution (Examples 11 to 14, Comparative Examples 13 to 16), secondary batteries comprising an electrolyte solution containing a halogenated acid anhydride (Examples 11 to 14) have achieved lower volume increase ratio than the secondary batteries (Comparative examples 13 to 16) comprising an electrolyte solution containing a non-halogenated acid anhydride. On the other hand, among the secondary batteries comprising a electrolyte solvent with DEC ratio of 50 vol % or less in the electrolyte solution (Comparative Examples 11, 12, 17 and 18), no significant change in volume increase ratio is observed between that comprising a halogenated acid anhydride and that comprising a non-halogenated acid anhydride, and therefore, effect of preventing volume increase by halogenated acid anhydrides is not observed.

Examples 15 to 18, Comparative Examples 19 to 22

Example 15

A secondary battery was fabricated and evaluated as in Example 1 except that, as a negative electrode active material, artificial graphite was used in place of natural graphite. The results are shown in Table 5.

Example 16

A secondary battery was fabricated and evaluated as in Example 15 except that Compound No. 5 in Table 1 was used as halogenated acid anhydride in place of Compound No. 1. The results are shown in Table 5.

Example 17

A secondary battery was fabricated and evaluated as in Example 1. The results are shown in Table 5.

Example 18

A secondary battery was fabricated and evaluated as in Example 17 except that Compound No. 5 in Table 1 was used as halogenated acid anhydride in place of Compound No. 1. The results are shown in Table 5.

Comparative Example 19

A secondary battery was fabricated and evaluated as in Example 15 except that acetic anhydride was used in place of Compound No. 1 which is a halogenated acid anhydride. The results are shown in Table 5.

Comparative Example 20

A secondary battery was fabricated and evaluated as in Example 15 except that succinic anhydride was used in place of Compound No. 1 which is a halogenated acid anhydride. The results are shown in Table 5.

Comparative Example 21

A secondary battery was fabricated and evaluated as in Example 17 except that acetic anhydride was used in place of Compound No. 1 which is a halogenated acid anhydride. The results are shown in Table 5.

Comparative Example 22

A secondary battery was fabricated and evaluated as in Example 17 except that succinic anhydride was used in place of Compound No. 1 which is a halogenated acid anhydride. The results are shown in Table 5.

TABLE 5

| | Additive | Negative electrode active material | Volume Increase Ratio at 45° C. after 200 cycles (%) |
|---|---|---|---|
| Example 15 | No. 1 | artificial graphite | 0.8 |
| Example 16 | No. 5 | artificial graphite | 0.5 |
| Example 17 | No. 1 | natural graphite | 1.1 |
| Example 18 | No. 5 | natural graphite | 0.7 |
| Comparative Example 19 | acetic anhydride | artificial graphite | 7.2 |
| Comparative Example 20 | succinic anhydride | artificial graphite | 7.4 |
| Comparative Example 21 | acetic anhydride | natural graphite | 7.5 |
| Comparative Example 22 | succinic anhydride | natural graphite | 7 |

As shown in Table 5, in the secondary batteries comprising an electrolyte solution containing non-halogenated acid anhydride (Comparative Examples 19 to 22), no clear difference in the volume increase ratio was observed between those using natural graphite and those using artificial graphite as negative electrodes. On the other hand, in the secondary batteries comprising an electrolyte solution containing halogenated acid anhydride (Examples 15 to 18), the secondary battery comprising a negative electrode using an artificial graphite achieved further lower volume increase ratio than the secondary battery comprising a negative electrode using natural graphite. This is presumed that film-forming ability of the halogenated acid anhydride is improved by the use of artificial graphite.

INDUSTRIAL APPLICABILITY

The secondary battery according to an embodiment of the present invention may be applied to, for example, driving devices such as electric vehicles and plug-in hybrid vehicles, electric motorcycles, motor-assisted bicycles; tools such as power tools; electronic devices such as mobile terminals and note type personal computers; and storage batteries such as home-use storage systems and solar power generation systems.

EXPLANATION OF REFERENCE

1 positive electrode active material layer
2 negative electrode active material layer
3 positive electrode current collector
4 negative electrode current collector
5 separator
6 laminate package
7 laminate package
8 negative electrode tab
9 positive electrode tab
10 film package
20 battery element
25 separator
30 positive electrode
40 negative electrode

The invention claimed is:
1. A secondary battery comprising an electrode element comprising a positive electrode comprising a positive electrode active material and a negative electrode comprising a negative electrode active material, and an electrolyte solution, wherein the electrolyte solution comprises:
a supporting salt selected from lithium salts,
a non-aqueous solvent consisting of (i) a compound having a viscosity of 1.0 mPa·s or less selected from open-chain carbonates in an amount of 60% by volume or more in the non-aqueous solvent and (ii) at least one solvent selected from the group consisting of a cyclic carbonate, γ-lactones, cyclic ethers, and their fluorine derivatives, wherein the selected cyclic carbonate is one of ethylene carbonate, butylene carbonate and vinylene carbonate, and a halogenated cyclic carboxylic acid anhydride in which all hydrogen atoms are substituted with fluorine atoms, in a content of 0.1 mass % or more to 5 mass % or less in the electrolyte solution;

further wherein the negative electrode active material comprises graphite and the positive electrode active material comprises a lithium composite oxide $Li_\alpha Ni_\beta Co_\gamma Mn_\delta O_2$ ($1 \leq \alpha \leq 1.2$, $\beta+\gamma+\delta=1$, $1>\beta\geq 0.5$, $\gamma \leq 0.4$, and $0<\delta$) in which a part of the transition metals thereof may be replaced by at least one element selected from the group consisting of Al, Mg, and Zr; and wherein the secondary battery uses a laminate film as a package.

2. The secondary battery according to claim 1, wherein the negative electrode active material comprises an artificial graphite.

3. A vehicle equipped with the secondary battery according to claim 1.

4. The secondary battery according to claim 1, wherein the halogenated cyclic acid anhydride is a compound in which carbon skeleton is constituted by single bonds only.

5. The secondary battery according to claim 1, wherein the compound having a viscosity of 1.0 mPa·s or less is at least a compound selected from the group consisting of dimethyl carbonate, ethyl methyl carbonate and diethyl carbonate.

6. The secondary battery according to claim 1, wherein the negative electrode further comprises at least one of silicon and silicon oxide.

7. The secondary battery according to claim 1, wherein the negative electrode active material is graphite.

8. The secondary battery according to claim 1, wherein the halogenated cyclic acid anhydride is one or more compounds selected from the group consisting of the following compounds:

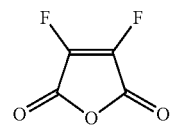

No. 1

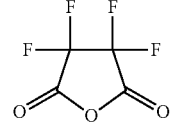

No. 2

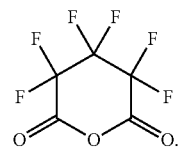

No. 5

9. The secondary battery according to claim 1, wherein the non-aqueous solvent comprises diethyl carbonate, as the compound having a viscosity of 1.0 mPa·s or less, in an amount of 60% by volume or more in the non-aqueous solvent.

10. The secondary battery according to claim 1, wherein the amount of the compound having a viscosity of 1.0 mPa·s or less selected from open-chain carbonates is 70% by volume or more in the non-aqueous solvent.

* * * * *